United States Patent
Jethwa et al.

(10) Patent No.: US 8,358,755 B1
(45) Date of Patent: Jan. 22, 2013

(54) PREVENTING UNDESIRED VOICEMAILS

(75) Inventors: Piyush Jethwa, Overland Park, KS (US); Baoquan Zhang, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 522 days.

(21) Appl. No.: 12/643,686

(22) Filed: Dec. 21, 2009

(51) Int. Cl.
*H04M 1/64* (2006.01)
*H04M 11/00* (2006.01)
*H04M 1/00* (2006.01)
*H04M 11/10* (2006.01)

(52) U.S. Cl. ............... 379/88.23; 379/88.11; 379/88.18; 379/164; 455/413

(58) Field of Classification Search ...... 379/67.1–88.23, 379/211.02, 100.12; 455/413, 560–569
See application file for complete search history.

(56) References Cited

U.S. PATENT DOCUMENTS

| | | | | |
|---|---|---|---|---|
| 5,651,054 A * | 7/1997 | Dunn et al. | ................. | 379/88.11 |
| 6,529,587 B1 * | 3/2003 | Cannon et al. | ............. | 379/88.18 |
| 6,639,972 B1 * | 10/2003 | Cannon et al. | ............. | 379/88.18 |
| 7,133,503 B2 * | 11/2006 | Revisky et al. | ............ | 379/88.12 |
| 7,187,759 B2 * | 3/2007 | Patel et al. | .................. | 379/88.18 |
| 7,551,725 B2 * | 6/2009 | Kafka | ......... | 379/32.01 |
| 2005/0152515 A1 * | 7/2005 | Amir et al. | ................. | 379/88.13 |
| 2006/0029189 A1 * | 2/2006 | Patel et al. | .................. | 379/67.1 |
| 2007/0041518 A1 * | 2/2007 | Silver et al. | .................. | 379/67.1 |
| 2008/0261564 A1 * | 10/2008 | Logan | ........................ | 455/413 |
| 2009/0207982 A1 * | 8/2009 | O'Connell et al. | ........ | 379/88.23 |
| 2010/0151915 A1 * | 6/2010 | Huisken | ....................... | 455/567 |

* cited by examiner

*Primary Examiner* — Mohammad Islam

(57) ABSTRACT

Methods are provided for preventing the delivery of undesired voicemails, which may occur when a voicemail is being left for a given user, and the given user calls back the user currently leaving the voicemail. An incoming call is received while a communications device is facilitating a recording of the voicemail. A voicemail system is instructed to prevent the voicemail from being delivered and also to terminate a suspended call corresponding to the recording of the voicemail. The incoming call is connected.

16 Claims, 6 Drawing Sheets

PREVENTING UNDESIRED VOICEMAILS

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods for preventing undesired voicemails to be delivered to the intended recipient. This may arise, for example, when a first user is in the process of leaving a voicemail for a second user, and during this time, the second user attempts to call the first user. The first user may not want the incomplete voicemail to be delivered to the second user, and thus may be presented with an option that, when selected, instructs a voicemail system to disregard the voicemail so that it is prevented from being delivered to the intended recipient, or here, the second user. In one instance, the first user may not want the voicemail to be deleted but may want the suspended call corresponding to the recording of the voicemail to be terminated. While typically a returned call from the voicemail system is received at the communications device leaving the voicemail if the recording of the voicemail is interrupted, using embodiments of the present invention, this suspended call can be terminated, thus alleviating some of the user's frustration brought on by receiving the returned call. Selection of the option may also connect the call between the first and second users.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDMA | Code Division Multiple Access |
| DVD | Digital Versatile Disks |
| GPRS | General Packet Radio Service |
| GSM | Global System for Mobile communications (Groupe Spécial Mobile) |
| IP | Internet Protocol |
| LED | Light Emitting Diode |
| PDA | Personal Data Assistant |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
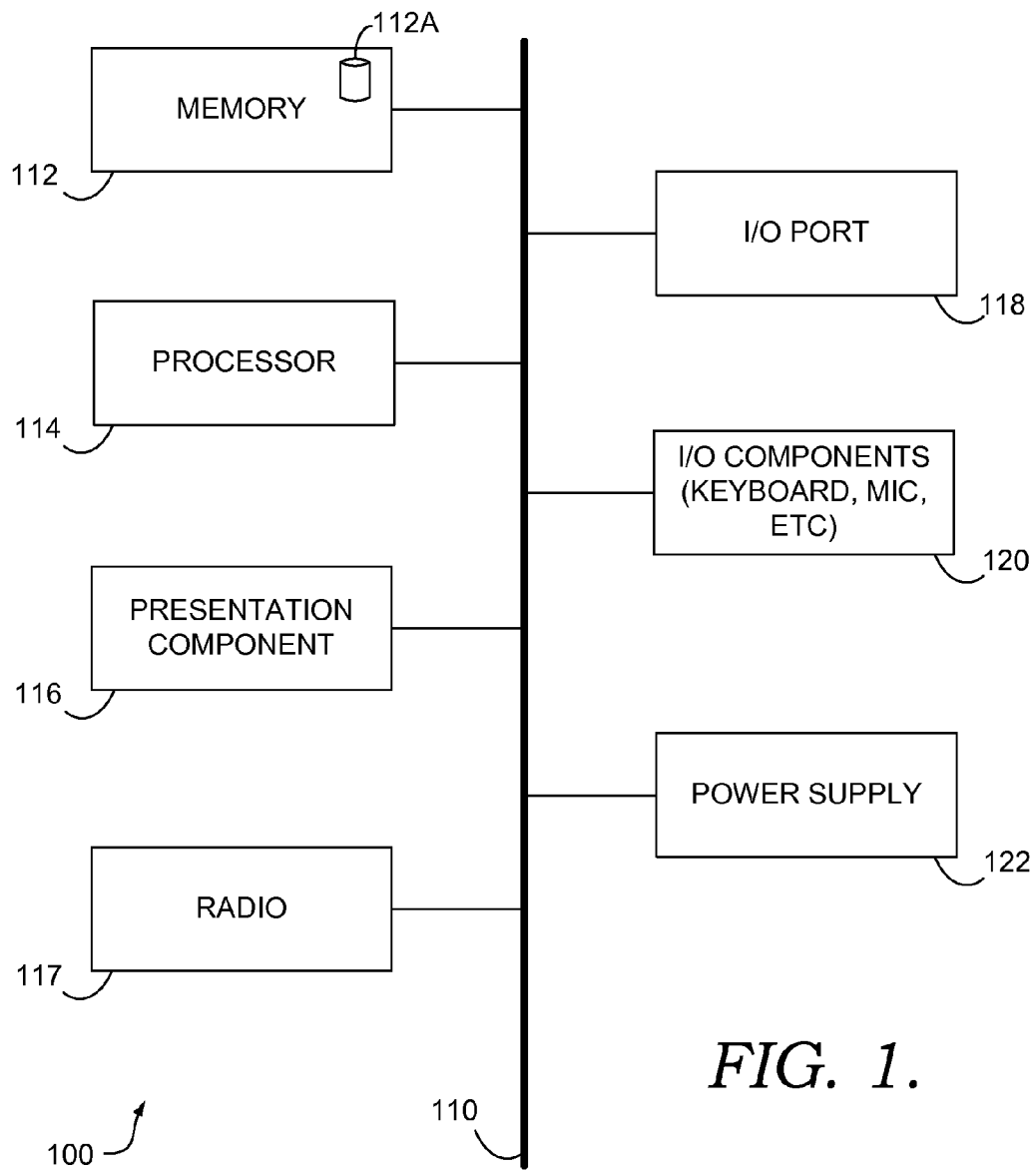
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keypads).

Radio 117 is a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keypads, microphones, touch screens, and any other item usable to directly or indirectly input data into mobile device 110. Power supply 122 includes items such as batteries, fuel cells, or any other component that can act as a power source to power mobile device 100.

Figure 2:
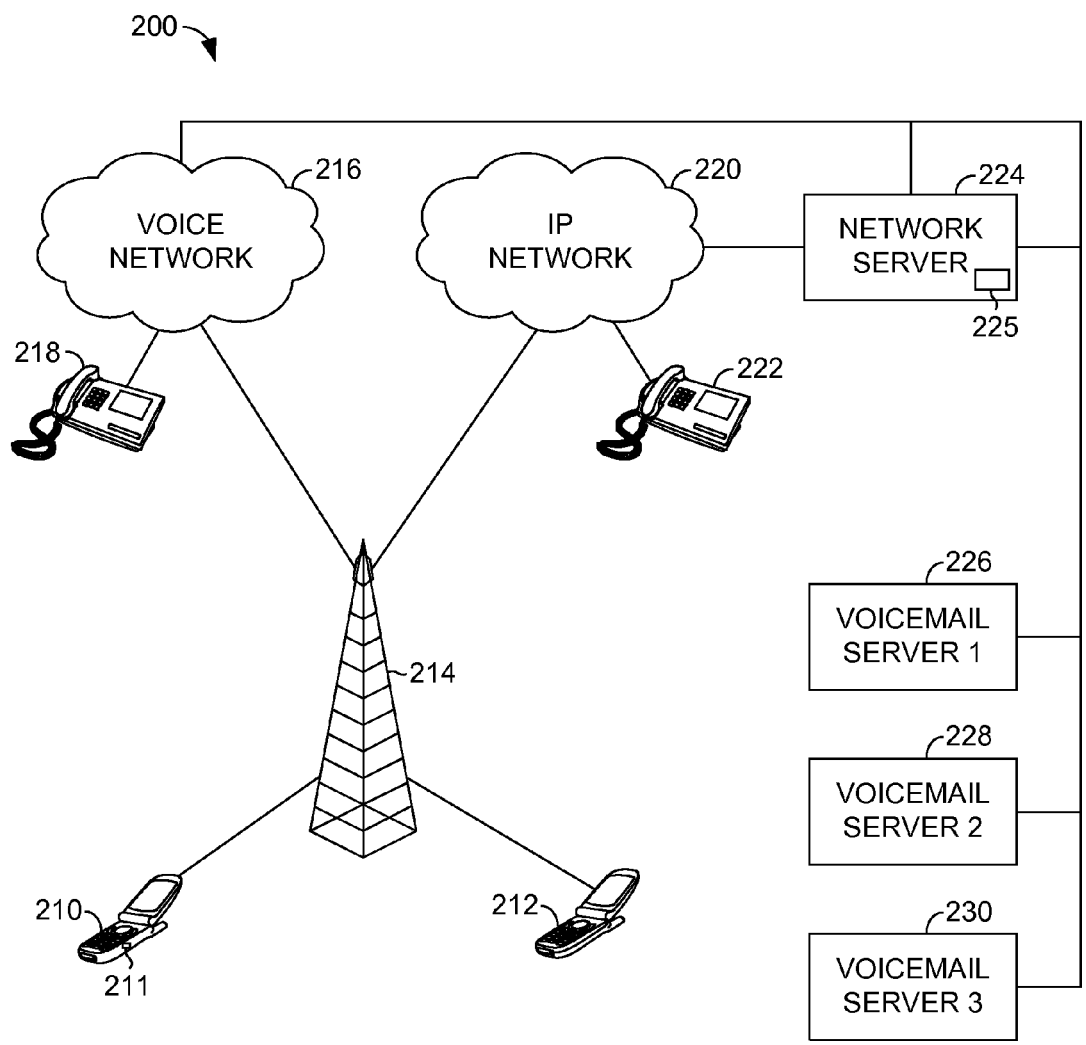
FIG. 2 depicts an illustrative operating environment suitable for practicing an embodiment of the present invention.

Turning now to FIG. 2, an illustrative operating environment is provided and referenced generally by the numeral 200. In one embodiment, the operating environment prevents undesired voicemails, such that it enables a user of a target device 210 to delete a voicemail message that the user is currently leaving for source device 212. In this way, a first user may be in the process of leaving a voicemail message on a communications device (e.g., mobile device, wired device) associated with the second user, when the second user realizes that the first user just called, but may not know that the first user is currently leaving a voicemail message for the second user. As such, the second user calls the first user back. The first user may not want the second user to listen to the voicemail message, which may only be a partial voicemail message, and thus may be presented with an option (e.g., smart answer) on the first user's communications device that, when selected, does one or more of the following: deletes the voicemail message; clears the suspended call between the first user and the voicemail system; or connects the first user to the second user, thus establishing a communications session between the two devices.

In one instance, the user may not want the voicemail message to be deleted but may want the suspended call between the first user and the voicemail system to be terminated. This may also appear as an option. Typically, when a user is leaving a voicemail message for another user, there is a suspended call between the device leaving the voicemail message and the voicemail system. If the user switches to an incoming call while leaving the voicemail message or otherwise ungracefully leaves the call, the call between the device and the voicemail system is suspended, and as such the voicemail system may call the device back with a returned call. This can be aggravating to the user to receive such a call. As such, one aspect of the present invention terminates this suspended call when the user selects the option presented to the user when the user's device receives an incoming call from another user's device for which the voicemail is currently being left.

In another embodiment, however, instead of terminating the suspended call between the user's device and the voicemail system, the voicemail system may still call the device back with a blank message, but an application on the device, such as client application 211, may silently answer the call and disconnect it. The user may not even know there was a call.

While "device" is used herein to describe the pieces of equipment that communicate with each other, leave voicemails for each other, etc., the device can be any type of device that is capable of leaving a voicemail for another device. For example, mobile communication devices, voice over IP (VoIP) devices, wired devices, or the like may be used to effectively carry out aspects of the present invention. In one instance, the device is the mobile device as described above with respect to FIG. 1.

In one embodiment, target device 210 includes computer-readable media, which includes an application 211, which facilitates various functional aspects of embodiments of the present invention. By way of example, the client application 211 may receive a notification that another device, such as the source device 212 is attempting to establish a communications session with the target device 210, wherein the target device 210 is currently facilitating a recording of a voicemail message on the source device 212. In response to the incoming call from the source device 212 to the target device 210, the client application 211 displays, on the target device 210, an option that is selectable by the user. The selection of the option operates to delete the pending voicemail message, terminate the suspended call with the voicemail system, and/or accept the incoming call from the source device 212.

In some embodiments, the client application 211 may also receive a user selection of the option, accept the incoming call from the source device 212, and communicate to a network component that the user selected the option to delete the voicemail. The network component, in one embodiment, is a network application 225 on a network server 224 that directs one or more voicemail servers 226, 228, or 230 or systems to delete the voicemail. Along with an indication that the user has chosen the option, several types of information may also be communicated from the client application 211 to the network application 225, including, but not limited to, a telephone number associated with the target device 210 and the source device 212, a time that the voicemail was left, whether or not the voicemail is to be deleted, how soon the voicemail is to be deleted, etc. This list is meant to provide examples as to the types of information that may be sent to the network component and is not meant to be exhaustive.

The target device 210, via the client application 211, in one embodiment, communicates data to and receives data from various network components by way of a base transmittal station 214 (BTS) using a wireless link. The network components may include, for example, a voice network 216, an Internet protocol (IP) network 220, a network server 224, and one or more voicemail servers, such as voicemail server 1 226, voicemail server 2 228, and voicemail server 3 230. These voicemail servers may also be referred to as voicemail systems herein. Embodiments of the present invention can be used in conjunction with various types of devices, including mobile devices (e.g., cellular devices), or wired (e.g., landline) devices (e.g., home or office telephones). In the case of wired devices that do not communicate through a BTS, a voice network 216 may be used to transfer data from one device to another.

For example, a device, such as wired device 218, may communicate by way of the voice network 216. In one instance, the network server 224 and the network application 225 perform the same functions as they would if mobile devices were used, which may include receiving information from the devices and directing the voicemail servers to delete voicemails and terminate pending calls between a device and the voicemail server. In other instances, however, the voice network 216 may communicate directly with the voicemail servers to delete voicemails and terminate suspended calls. Both embodiments are illustrated in FIG. 2.

Further, voice over IP (VoIP) devices 222 may communicate directly with the IP network 220 and the network server 224 to carry out aspects of the present invention. In one embodiment, one or more of the target device 210 or the source device 212 is a mobile communications device that communicates with a network via the BTS 214. In this embodiment, data, such as an indication of the user's selection and information regarding the deletion of the voicemail is communicated via the BTS 214 to the voice network 216. The voice network 216 transmits the data to the network server 224 and more particularly, the network application 225 which may determine which voicemail server stores the voicemail that is to be deleted. The network application 225 may instruct the voicemail server to delete that voicemail.

Figure 3:
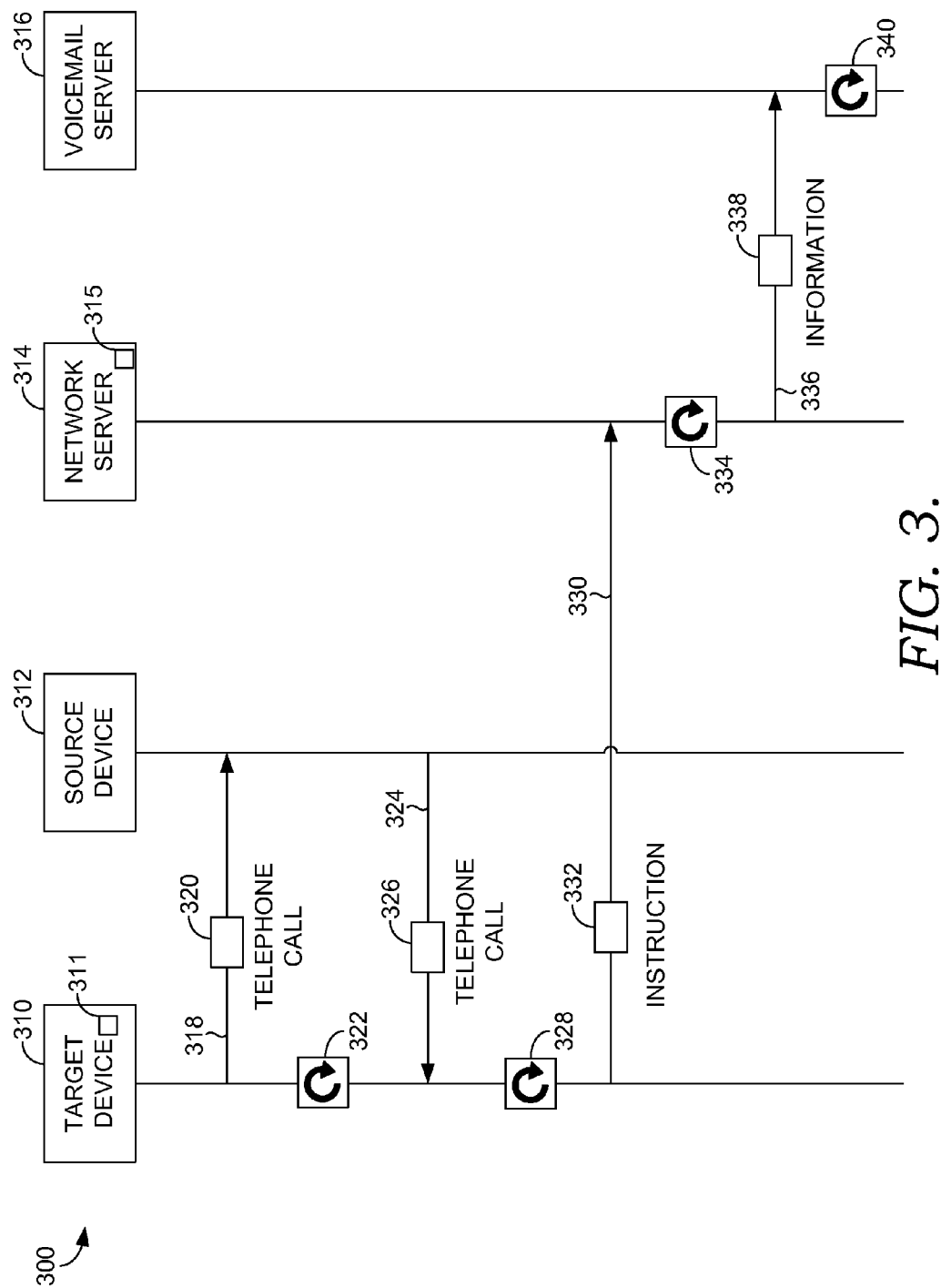
FIG. 3 depicts an illustrative flow diagram of a method for preventing undesired voicemails, according to an embodiment of the present invention.

Turning now to FIG. 3, an illustrative flow diagram is shown of a method for preventing undesired voicemails, in accordance with an embodiment of the present invention. Preventing undesired voicemails may include enabling a user of a target device to delete a voicemail message that is left for a user of another device, such as a source device. This method is referenced generally by numeral 300. Initially, a target device 310 initiates 318 a telephone call 320 to a source device 312, and the user of the source device 312 fails to answer or accept the incoming call. The user of the target device 310 proceeds to leave or communicate a voicemail, shown at step 322, for the source device 312. At anytime between the instance when the voicemail is started until the instance when the user terminates the call which resulted in at least a partial voicemail, the user of the source device 312 initiates 324 a telephone call 326 to the target device 310.

Typically, while the voicemail is being communicated, the recipient of the voicemail is unaware that a voicemail is being left at that time. As such, the recipient of the voicemail may call the device that is facilitating a recording of the voicemail and interrupt the communication of the voicemail message. As many communication devices have call waiting capabilities, the user leaving the voicemail may become aware of the incoming call (e.g., a sound, message appearing on the device). Typically, if the user chooses to accept the incoming call, a partial voicemail message may be left for the recipient of the voicemail. Moreover, as the user has ungracefully left the call with the voicemail system to answer the incoming call from the recipient of the voicemail, the call with the voicemail system is suspended. Alternatively, ungracefully leaving the call with the voicemail system may terminate the call. In either case, the voicemail system may initiate a call to the device that was facilitating the recording of the voicemail. This call is typically blank. This can be irritating to the user who receives this call.

Returning to FIG. 3, once the user of the source device 312 initiates 324 a telephone call 326 to the target device 310, a client application 311 associated with the target device 310 presents an option on the display of the device, shown at step 328. The option is presented on the device prior to acceptance of the call, such as while the device is ringing indicating that there is an incoming call. In one embodiment, selection of the option prompts the deletion of the voicemail and terminates the suspended call between the target device 310 and the voicemail system. Selecting the option may also accept the incoming call.

In another embodiment, selection of the option does not delete the voicemail, but does terminate the suspended call with the voicemail system. In this embodiment, the user leaving the voicemail may not want the voicemail to be deleted so that the user does not have to repeat all of the information left in the voicemail. In this case, the user may choose not to delete the voicemail when presented with the option. Also at step 328, the target device 310, which may be the client application 311, receives a user selection of the option. To delete the voicemail and/or terminate the suspended call with the voicemail system, the client application 311 communicates 330 an instruction 332 to the network server 314, such as a network application 315 located on the network server 314. The instruction 332 may instruct that the voicemail be disregarded (e.g., deleted), and/or that the suspended call with the voicemail system be terminated.

The instruction 332 may include one or more types of information, including a telephone number associated with the source device and the target device, a time that the voicemail was communicated to the source device, a delete flag indicating whether to delete the voicemail message, or a time to delete the voicemail if the voicemail is to be deleted (e.g., a deletion time indicator). The information is processed at step 334, and the information 338 is communicated 336 to the voicemail server 316. In one instance, the network server 314 also communicates to the voicemail server 316 an instruction, similar to the instruction 332 that was received by the network server 314 by the target device 310. It may instruct the voicemail server 316 to disregard (e.g., delete) the voicemail, and/or terminate the suspended call with the voicemail system. At step 340, the voicemail server 316 deletes the voicemail from storage and/or terminates the suspended call with the target device 310.

Figure 4:
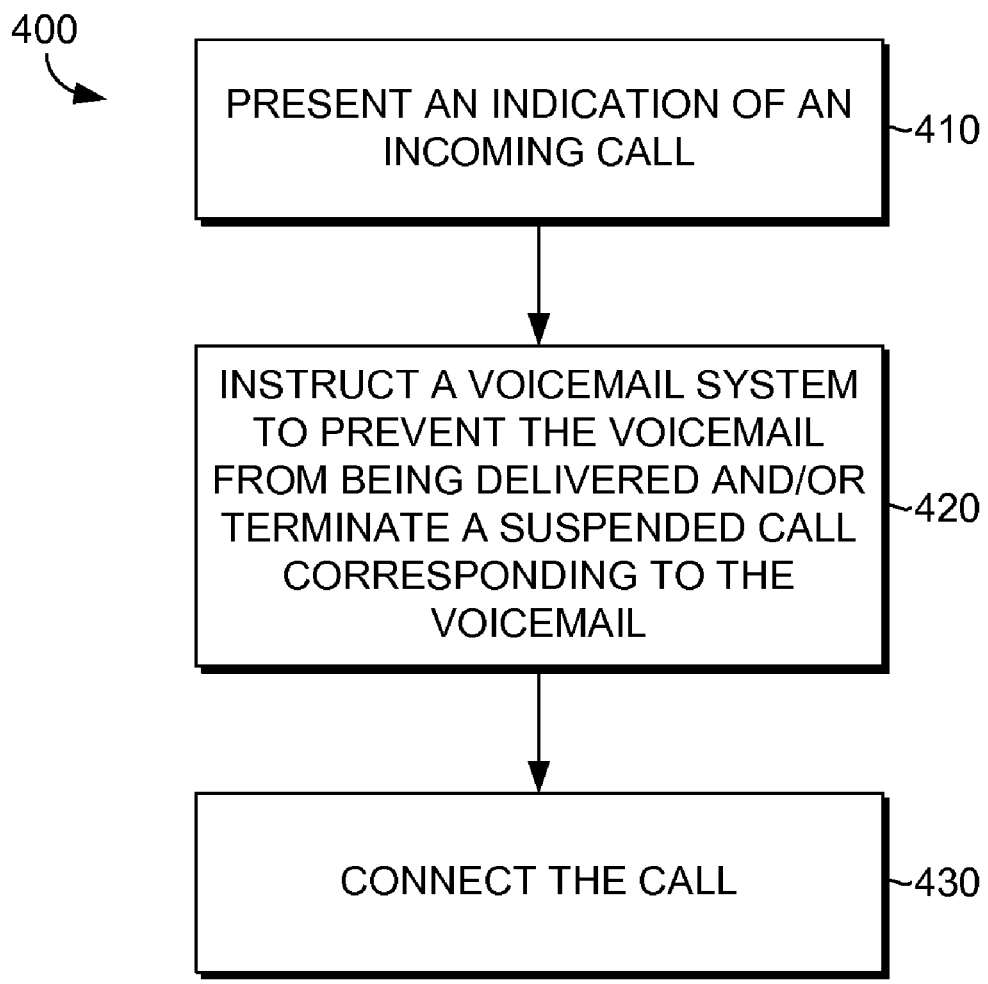
FIGS. 4-6 depict illustrative flowcharts of methods for preventing undesired voicemails, according to embodiments of the present invention.

FIG. 4 depicts an illustrative flowchart of a method 400 for preventing undesired voicemails, in accordance with an embodiment of the present invention. Initially, as shown at step 410, an indication of an incoming call is presented. The indication is presented on a communications device and is presented while the communications device is being used to record a voicemail intended to be sent to a given person. As described above, the communications device may be a target device, and the device associated with the given person may be a source device. Here, the communications device may be a mobile device, a wired or landline device, a VoIP device, or the like. Further, the device associated with the given person may also be any one of the types of communications devices mentioned above. In this embodiment, a user associated with the communications device may have placed a call to the given user and is in the process of leaving a voicemail for the given user when the given user places a call to the user associated with the communications device. The indication of the incoming call may be a sound, such as a beep (e.g., beep that indicates call waiting), or it may be a text box that appears on a display of the communications device. The text box may identify the caller or the caller's phone number, for example.

At step 420, a voicemail system is instructed to prevent the voicemail from being delivered, and/or to terminate a suspended call corresponding to the voicemail. Whether the voicemail system is instructed to do one or the other or both depends on what the user desires. Preventing the voicemail from being delivered may include deleting or disregarding the voicemail from the voicemail system, or if the voicemail has already been delivered to the device for which the voicemail is left, deleting the voicemail from that device. The suspended call corresponds to the voicemail that is recorded by the communications device and may be between the communications device leaving the voicemail and the voicemail system, for example. If the suspended call is not terminated, the communications device may receive a returned call from the voicemail system some time after the call between the communications device and the given person. As such, terminating the suspended call prevents the communications device from receiving a returned call. The returned call may indicate that the user of the communications device accepted an incoming call while leaving a voicemail for another device, for instance.

In one embodiment, an option may be presented to the user, such as in the form of a message that appears on the display of the communications device. The option may allow the user to select whether the user would like the voicemail to be deleted, whether the user would like the suspended call with the voicemail system to be deleted, or in some embodiments, both. As a result of the user selecting the option, the voicemail system is instructed to delete the voicemail and/or terminate the pending call. Once the option is selected, the communications device, such as a client application located in the device, may communicate information to a network component, such as a network server. The network server, in one instance, includes a network application that receives the information and instructs the voicemail system. Depending on the information, the network application may instruct the voicemail system to disregard the voicemail or terminate the suspended call, or both. The information may include one or more of a telephone number associated with the source device and the target device, a time that the voicemail was communicated to the source device, a delete flag indicating whether to delete the voicemail message, or a time to delete the voicemail if the voicemail is to be deleted (e.g., a deletion time indicator). Selecting the option described above may also cause the communications device to accept or connect the incoming call, shown at step 430.

Figure 5:
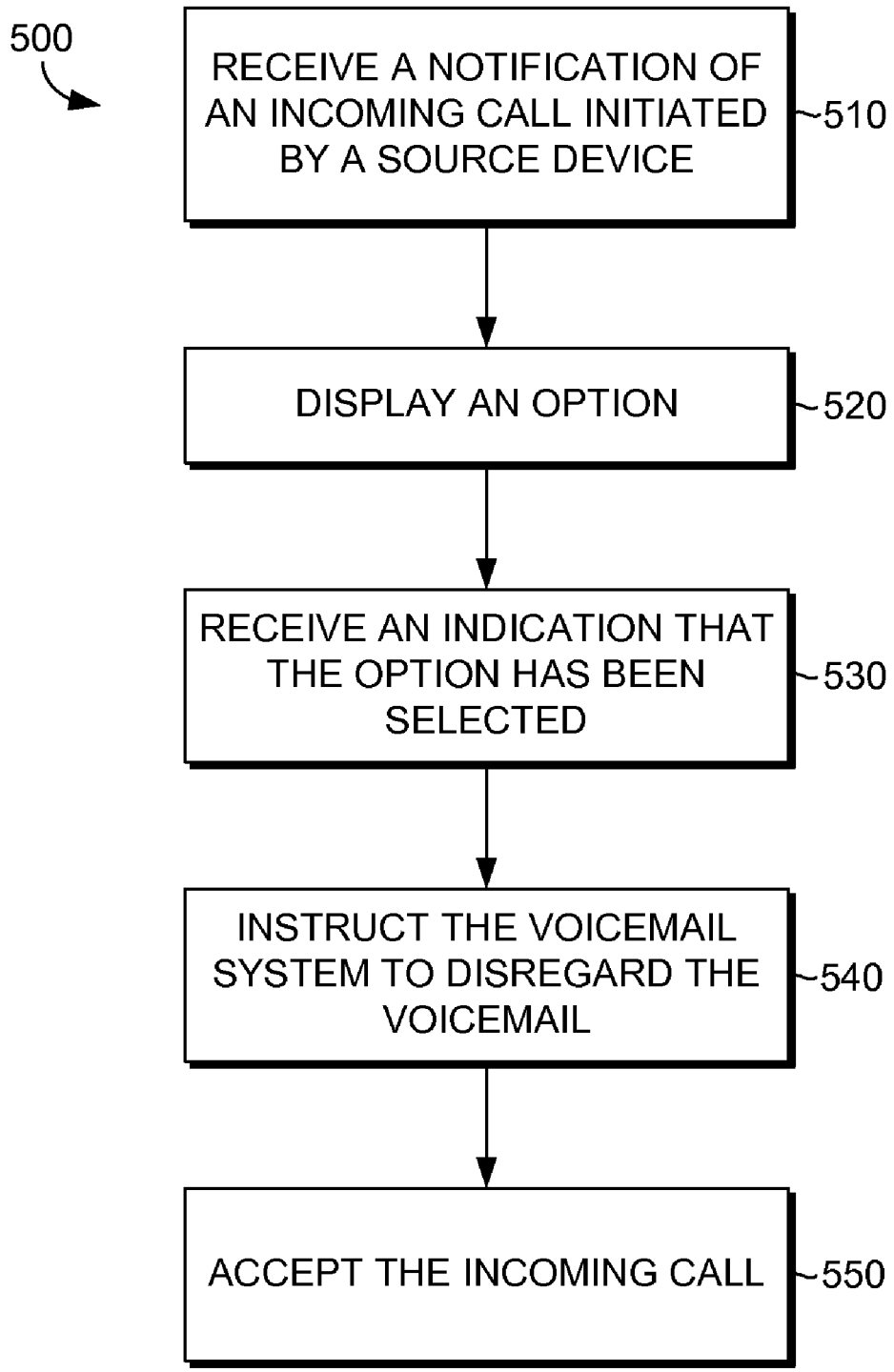

Referring to FIG. 5, an illustrative flowchart is shown of another method 500 for preventing undesired voicemails, in accordance with an embodiment of the present invention. At step 510, a notification of an incoming call that is initiated by a source device is received. The notification is received at a target device, and the incoming call is initiated by a source device that is associated with a given user. Here, the voicemail is being left, or is intended for the given user associated with the source device. Generally, the target device receives an incoming call from the source device while the target device is facilitating a recording of a voicemail intended for the user of the source device. The target device can be any type of device that is mentioned herein. The source device, in embodiments described herein, places a call to the target device and is the intended recipient of the voicemail. In one instance, the notification is received at the target device while the target device is currently facilitating a recording of a voicemail by a voicemail system. For example, many devices are capable of facilitating call waiting, where the device can receive a notification of an incoming call while the device has an established call with another device. As such, the notification may be in the form of a sound (e.g., beep) or a text box that appears on the target device's display screen that indicates to the user that another call is incoming.

At step 520, an option is displayed. In one embodiment, upon receiving the notification, the option is displayed on a display screen of the target device and, when or if it is selected by the user of the target device, it instructs the voicemail system to disregard the voicemail, and instructs the target device to accept the incoming call. An indication is received that the option has been selected, shown at step 530. The option may have been selected, for example, by the user of the target device. As described, the option may take the form of a text box, for example, that is presented on the display of the target box. The user can select the text box if the device is a touch screen device, or can select a button on the device that is associated with the text box. Other methods of selecting the option are also contemplated to be within the scope of the present invention.

The voicemail system, at step 540, is instructed to disregard the voicemail. This instruction may be sent by a network component, such as a network server or a network application located on the network server. For example, the target device may communicate information to the network application regarding the voicemail, such as a telephone number associated with each of the source device and the target device, a time that the voicemail was communicated to the source device, a delete flag indicating whether to delete the voicemail message, or a time to delete the voicemail if the voicemail is to be deleted (e.g., a deletion time indicator). The target device may also communicate to the network application that the option has been selected by the user. The network application may use that information to form its instructions that are sent to the voicemail system. In one instance, the network application also identifies which voicemail system is responsible for the voicemail, if there is more than one voicemail system. In one embodiment, the voicemail system identified is the voicemail system that stores the voicemail. Further, in another embodiment, the target device also instructs the voicemail system (e.g., by way of a network component) to terminate a suspended call corresponding to the voicemail. The suspended call may be between the target device and the voicemail system. As discussed, terminating the suspended call prevents the target device from receiving a returned call from the voicemail system after the incoming call between the target and source devices has been terminated.

At step 550, the incoming call is accepted, thereby establishing a communications session between the target device and the source device. While some of the embodiments described herein include information sent though a network component, similar embodiments may be carried out without a network component. For instance, the target device may instruct the voicemail system directly to delete a voicemail, terminate a suspended call, etc., without a network application in the middle. Further, while the termination of the suspended call was described above, in one embodiment, the target device actually receives a returned call from the voicemail system as a result of the target device accepting the incoming call while facilitating the recording of the voicemail, but the target device is able to silently accept and terminate the returned call. The user of the target device may not even know that a returned call has been received.

Figure 6:
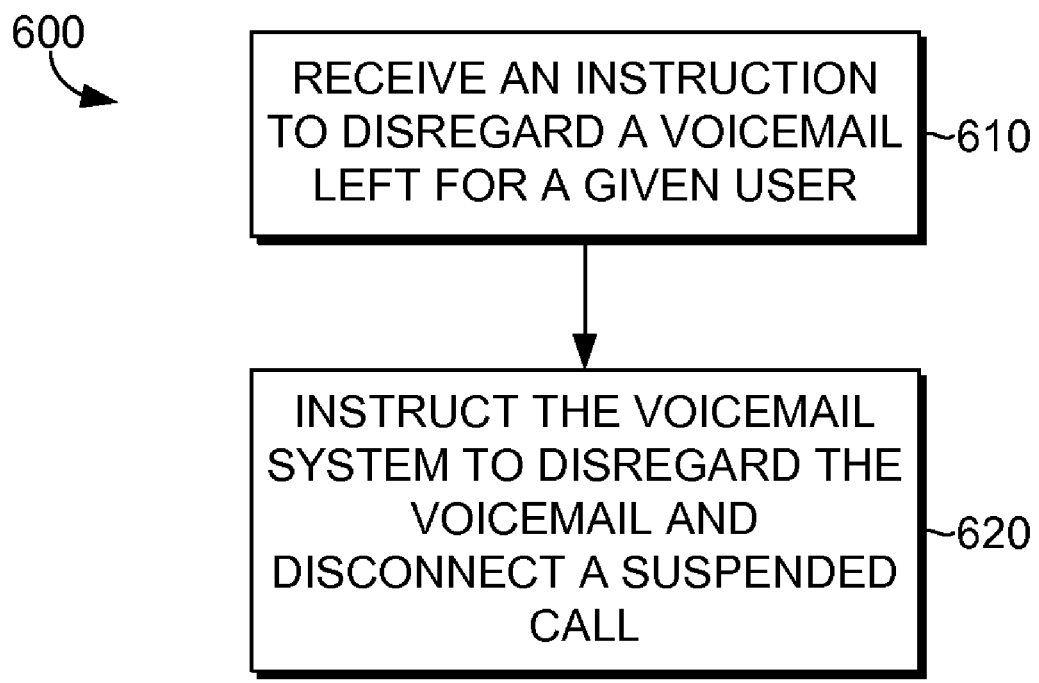

FIG. 6 illustrates a flowchart of another method 600 for preventing undesired voicemails, in accordance with an embodiment of the present invention. While the embodiments of FIGS. 4 and 5 were described from the point of view of the target device, the embodiment of FIG. 6 is described from the point of view of the network application. At step 610, an instruction is received to disregard a voicemail left for a given user who is associated with a source device. The instruction may be sent by a target device. The target device receives a notification of an incoming call from the source device while the target device is facilitating a recording of the voicemail. Further, the notification of the incoming call prompts a display of an option on the target device that, when selected, causes the target device to communicate the instruction to disregard the voicemail. In one instance, the network application may identify a voicemail system that stores the voicemail.

At step 620, the voicemail system is instructed to disregard the voicemail and to disconnect a suspended call corresponding to the voicemail left for the given user of the source device. Information may be communicated to the network application and may be forwarded to the voicemail system regarding the deletion of the voicemail. This information may include, for example and not limitation, a telephone number associated with each of the source device and the target device, a time that the voicemail was communicated to the source device, a delete flag indicating whether to delete the voicemail message, or a time to delete the voicemail if the voicemail is to be deleted (e.g., a deletion time indicator).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, facilitate a method of preventing undesired voicemails, the method comprising:
   while a caller's communications device is being used to record a voicemail that is intended to be sent to a given person, presenting to the caller's communications device an indication of an incoming call from the given person, said presenting comprising:
   displaying at least one option in response to the indication of the incoming call, prior to connecting the incoming call;
   based on a selection made by the caller among the at least one option, instructing a voicemail system to
      (1) prevent the voicemail from being delivered to the given person, and
      (2) terminate a suspended call corresponding to the voicemail that is recorded through the communications device; and
   connecting the call;
   wherein terminating the suspended call prevents the caller's communications device from receiving a returned call from the voicemail system after the call between the caller's communications device and the given person is disconnected.

2. The media of claim 1, further comprising displaying an option in response to the indication of the incoming call that, when selected, instructs the voicemail system to delete the voicemail.

3. The media of claim 2, further comprising upon selection of the option, accepting the incoming call.

4. The media of claim 1, wherein preventing the voicemail from being delivered to the given person further comprises instructing the voicemail system to disregard the voicemail.

5. The media of claim 1, further comprising communicating information to a network server that instructs the voicemail system to delete the voicemail.

6. The media of claim 5, wherein the communications device is a target device and wherein the given user is associated with a source device.

7. The media of claim 6, wherein the information includes one or more of,
   (1) a telephone number associated with the target device,
   (2) a telephone number associated with the source device,
   (3) a time when the voicemail is to be deleted,
   (4) the time associated with the voicemail, or
   (5) a delete flag that indicates whether the voicemail is to be deleted.

8. One or more non-transitory computer-readable media having computer-executable instructions embodied thereon that, when executed, facilitate a method of preventing undesired voicemails, the method comprising:
   at a target device, receiving a notification of an incoming call that was initiated by a source device that is associated with a given user,
      (1) wherein the notification is received while the target device is currently facilitating a recording of a voicemail by a voicemail system,
      (2) wherein the voicemail is being left for the given user;
   upon receiving the notification, and prior to accepting the incoming call, displaying an option that, when selected,
      (1) instructs the voicemail system to disregard the voicemail, and
      (2) instructs the target device to accept the incoming call;
   receiving an indication that the option has been selected;
   instructing the voicemail system to disregard the voicemail;
   accepting the incoming call, thereby establishing a communications session between the target device and the source device; and
   after the communications session is ended, preventing a returned call from the voicemail system as a result of the target device accepting the incoming call while the target device is facilitating the recording of the voicemail.

9. The media of claim 8, wherein instructing the voicemail system to disregard the voicemail includes communicating to a network component that the option has been selected such that the voicemail system is instructed, by way of the network component, to disregard the voicemail.

10. The media of claim 9, wherein the network component also instructs the voicemail system to terminate a suspended call corresponding to the voicemail.

11. The media of claim 10, wherein the suspended call is between the target device and the voicemail system.

12. The media of claim 9, wherein the network component is a network application on a network server.

13. One or more non-transitory computer-readable media having computer-executable instructions embodied thereon that, when executed, facilitate a method of preventing undesired voicemails, the method comprising:
   receiving an instruction at a network component associated with a voicemail system from a target device to disregard a voicemail left for a given user associated with a source device,
      (1) wherein the target device receives a notification of an incoming call from the source device while the target device is facilitating a recording of the voicemail,
      (2) wherein the notification of the incoming call prompts a display of an option on the target device that, when selected, causes the target device to communicate the instruction to disregard the voicemail, wherein the option is displayed prior to accepting the incoming call; and
   instructing the voicemail system to,
      (1) disregard the voicemail, and
      (2) disconnect a suspended call corresponding to the voicemail left for the given user of the source device, wherein disconnecting the suspended call prevents the target device from receiving a returned call from the voicemail system.

14. The media of claim 13, further comprising identifying the voicemail system that stores the voicemail.

15. The media of claim 13, further comprising communicating to the voicemail system information associated with the voicemail.

16. The media of claim 15, wherein the information includes one or more of, (3) a telephone number associated with the target device,
(4) a telephone number associated with the source device,
(5) a time when the voicemail is to be deleted,
(6) the time associated with the voicemail, or
(7) a delete flag that indicates whether the voicemail is to be deleted.

* * * * *